(12) United States Patent
Chen

(10) Patent No.: US 12,654,339 B2
(45) Date of Patent: Jun. 16, 2026

(54) ROBOTIC ARM REPLACEMENT SYSTEM AND METHOD, AND ELECTRONIC DEVICE AND STORAGE MEDIUM

(71) Applicant: Ronovo (Shanghai) Medical Science and Technology Ltd., Shanghai (CN)

(72) Inventor: Zike Chen, Shanghai (CN)

(73) Assignee: RONOVO (SHANGHAI) MEDICAL SCIENCE AND TECHNOLOGY LTD., Shanghai (CN)

( * ) Notice: Subject to any disclaimer, the term of this patent is extended or adjusted under 35 U.S.C. 154(b) by 112 days.

(21) Appl. No.: 18/710,806

(22) PCT Filed: Nov. 14, 2022

(86) PCT No.: PCT/CN2022/131709
§ 371 (c)(1),
(2) Date: May 16, 2024

(87) PCT Pub. No.: WO2023/088207
PCT Pub. Date: May 25, 2023

(65) Prior Publication Data
US 2025/0018586 A1 Jan. 16, 2025

(30) Foreign Application Priority Data
Nov. 16, 2021 (CN) .......................... 202111357910.1

(51) Int. Cl.
*A61B 34/00* (2016.01)
*A61B 34/30* (2016.01)
(Continued)

(52) U.S. Cl.
CPC ............... *B25J 18/00* (2013.01); *B25J 9/161* (2013.01); *B25J 9/1661* (2013.01)

(58) Field of Classification Search
CPC .......... B25J 18/00; B25J 9/161; B25J 9/1661; A61B 34/25; A61B 34/30; A61B 34/70; A61B 34/74; G16H 40/67; G16H 40/40
See application file for complete search history.

(56) References Cited

U.S. PATENT DOCUMENTS

2006/0149418 A1   7/2006   Anvari
2014/0226459 A1   8/2014   Edmiston
(Continued)

FOREIGN PATENT DOCUMENTS

CN        111113456 A     5/2020
CN        112171656 A     1/2021
(Continued)

OTHER PUBLICATIONS

Hares, Luke David Ronald, Roberts, Paul Christopher, Menzies, Rupert, Method And System For Providing Assistance To A User Of A Surgical Robot System CN 112770688 A, 2019 (Year: 2019).*
(Continued)

*Primary Examiner* — Adam R Mott
*Assistant Examiner* — Heather J Keniry
(74) *Attorney, Agent, or Firm* — Leydig, Voit & Mayer, Ltd.

(57) ABSTRACT

A system includes a controller and at least two robotic arms. The controller includes multiple interfaces. Each controller interface is configured with robotic arm configuration information. Each robotic arm is connected to the controller based on a robotic arm identifier of the respective robotic arm to receive and execute an operation instruction transmitted by the controller. The controller is configured to monitor operation states of the at least two robotic arms, determine a to-be-replaced robotic arm and generate replacement prompt information of the to-be-replaced robotic arm based on the operation states of the at least two (Continued)

robotic arms, and control, in a replacement process of the to-be-replaced robotic arm, each of the at least two robotic arms other than the to-be-replaced robotic arm to continue executing the operation instruction.

14 Claims, 2 Drawing Sheets

(51) Int. Cl.
| | |
|---|---|
| *B25J 9/16* | (2006.01) |
| *B25J 18/00* | (2006.01) |
| *G16H 40/40* | (2018.01) |
| *G16H 40/67* | (2018.01) |

(56) References Cited

U.S. PATENT DOCUMENTS

| | | |
|---|---|---|
| 2015/0112481 A1 | 4/2015 | Burns et al. |
| 2020/0078096 A1 | 3/2020 | Barbagli et al. |
| 2024/0253232 A1* | 8/2024 | Thon .......................... B25J 9/161 |
| 2024/0308075 A1* | 9/2024 | Rea .......................... B25J 9/1682 |

FOREIGN PATENT DOCUMENTS

| | | |
|---|---|---|
| CN | 112508385 A | 3/2021 |
| CN | 112770688 A | 5/2021 |
| CN | 112992326 A | 6/2021 |
| CN | 113040913 A | 6/2021 |
| CN | 114628019 A | 6/2022 |
| WO | 2020070511 A1 | 4/2020 |
| WO | 2021158306 A1 | 8/2021 |

OTHER PUBLICATIONS

State Intellectual Property Office, Search Report in corresponding Chinese Application No. 202111357910.1 dated Oct. 24, 2024.
State Intellectual Property Office, Office Action in corresponding Chinese Application No. 202111357910.1 dated Oct. 29, 2024.
China National Intellectual Property Administration, International Search Report in corresponding International Application No. PCT/CN2022/131709 dated Jan. 17, 2023, mailed on Jan. 28, 2023.
European Patent Office, European Search Report in corresponding European Patent Application No. 22894741.2 dated Nov. 19, 2025.
Nord Drivesystems, "EtherCAT bus interface" BU 2300—en, Supplementary manual options for Nord—Frequency Inverters, pp. 1-60 (Jan. 1, 2006) XP093331343.

* cited by examiner 310  320  330

Operation state monitoring module — To-be-replaced robotic arm determination module — Control module

28

12

30
RAM

34
Storage system

16
Processor

32
Cache memory 40
42

18

24
Display

22
I/O interface

20
Network adapter

14
External device

ROBOTIC ARM REPLACEMENT SYSTEM AND METHOD, AND ELECTRONIC DEVICE AND STORAGE MEDIUM

CROSS-REFERENCE TO RELATED APPLICATIONS

This application is a national stage of International Application No. PCT/CN2022/131709, filed Nov. 14, 2022, which claims priority to Chinese Patent Application No. 202111357910.1 filed with the China National Intellectual Property Administration (CNIPA) on Nov. 16, 2021, which are both expressly incorporated by reference in their entirety, including any references contained therein.

TECHNICAL FIELD

The present disclosure relates to the technical field of intelligent robot devices, for example, a robotic arm replacement system, method and apparatus, an electronic device and a storage medium.

BACKGROUND

A surgical robot uses a patient cart system of a da Vinci robot. The system consists of a pillar and four robotic arms that are extended based on the pillar. In the system, since the four robotic arms are jointly controlled by one system, a robotic arm cannot be replaced if damaged during use, and the entire patient cart system needs to be returned to the factory for repair. The other surgical robot uses a multi-pillar patient cart system of a Cambridge Medical Robotics (CMR) type. The system consists of one or more independent pillars. Each pillar is provided with a separate robotic arm. For the system, the system is also achieved by using one system to control multiple robotic arms simultaneously. Therefore, if a certain robotic arm is damaged during use, it is necessary to shut down the system, reconnect a new robotic arm, and restart and initialize the system; alternatively, the possibility of multiple robotic arm replacements is addressed through redundancy, i.e., pre-connecting multiple spare robotic arms before surgery begins.

SUMMARY

The present disclosure provides a robotic arm replacement system, method and apparatus, an electronic device and a storage medium The present disclosure provides a robotic arm replacement system. The system includes a controller and at least two robotic arms. The controller includes multiple interfaces. Each of the multiple controller interfaces is configured with robotic arm configuration information.

Each of the at least two robotic arms is connected to the controller through an Industrial Ethernet based on a robotic arm identifier of the respective robotic arm to receive and execute an operation instruction transmitted by the controller.

The controller is configured to monitor operation states of the at least two robotic arms, determine a to-be-replaced robotic arm and generate replacement prompt information of the to-be-replaced robotic arm based on the operation states of the at least two robotic arms, and control, in a replacement process of the to-be-replaced robotic arm, each of the at least two robotic arms other than the to-be-replaced robotic arm to continue executing the operation instruction, where the operation states include an operation fault state and an operation instruction state.

The present disclosure further provides a robotic arm replacement method applied to the robotic arm replacement system. The method includes the steps below.

Operation states of at least two robotic arms are monitored, where the operation states include an operation fault state and an operation instruction state.

Based on the operation states of the at least two robotic arms, a to-be-replaced robotic arm is determined, and replacement prompt information for replacing the to-be-replaced robotic arm is generated.

Each of the at least two robotic arms other than the to-be-replaced robotic arm is controlled to continue executing an operation instruction corresponding to each robotic arm in a replacement process of the to-be-replaced robotic arm.

The present disclosure further provides a robotic arm replacement apparatus. The apparatus includes an operation state monitoring module, a to-be-replaced robotic arm determination module and a control module.

The operation state monitoring module is configured to monitor operation states of at least two robotic arms, where the operation states include an operation fault state and an operation instruction state.

The to-be-replaced robotic arm determination module is configured to determine a to-be-replaced robotic arm and generate replacement prompt information for replacing the to-be-replaced robotic arm based on the operation states of the at least two robotic arms.

The control module is configured to control, in a replacement process of the to-be-replaced robotic arm, each of the at least two robotic arms other than the to-be-replaced robotic arm to continue executing an operation instruction corresponding to each robotic arm.

The present disclosure further provides an electronic device. The electronic device includes at least one processor, and a storage apparatus configured to store at least one program.

When executed by the at least one processor, the at least one program causes the at least one processor to perform the robotic arm replacement method.

The present disclosure further provides a computer-readable storage medium storing a computer program which, when executed by a processor, causes the processor to perform the robotic arm replacement method.

DETAILED DESCRIPTION

Figure 1:
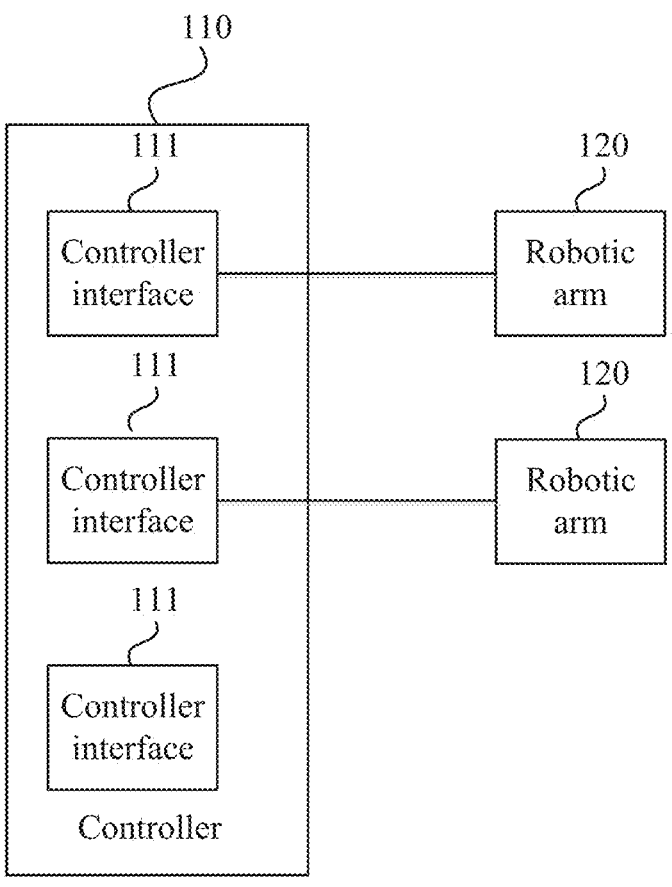
FIG. 1 is a diagram illustrating the structure of a robotic arm replacement system according to an embodiment of the present disclosure.

FIG. 1 is a diagram illustrating the structure of a robotic arm replacement system according to an embodiment of the present disclosure. This embodiment is applicable to the replacement of a robotic arm of a surgical robot during operation.

Before the technical solutions of embodiments of the present disclosure are introduced, an application scenario for implementing the technical solution of this embodiment is first introduced exemplarily. Certainly, the following application scenario is only an example application scenario. This embodiment may also be implemented in other application scenarios and does not limit the application scenario for implementing the technical method. For example, the application scenario includes that in a process of performing surgery with the surgical robot, the surgical robot may be damaged, that is, the surgical robot cannot continue executing an operation instruction of a controller. In the preceding case, there are generally two robotic arm replacement methods. One is that if the surgical robot uses a pillar to support multiple robotic arms, the system needs to be shut down, the pillar and the multiple robotic arms need to be replaced together, and the system needs to be reconnected after replacement. The other one is that if the surgical robot uses one pillar to support one robotic arm, after the system is shut down, a new robotic arm is reconnected, and the system is restarted and initialized.

In the preceding two surgical robot replacement processes, the first replacement manner requires complete replacement, which is cumbersome to operate and requires a relatively high maintenance cost, and moreover, the system needs to be shut down before a different robotic arm is reconnected in the replacement process; and the second replacement manner requires a different robotic arm to be reconnected after the system is shut down, thereby resulting in a required reconfiguration (initialization) of the entire surgical robot's hardware system before a newly connected robotic arm can be used. The initialization requires the system and a doctor to reset the relevant configuration, resulting in a cumbersome replacement operation of the surgical robot in a maintenance process. After a robotic arm is replaced, the entire surgical robot system needs to be reconfigured, which may lead to a surgical interruption, thereby causing a surgical risk.

The technical solutions of the embodiments of the present disclosure are improved based on the second replacement manner. For example, before a surgical task is performed, multiple controller interfaces of the controller are each pre-configured with corresponding robotic arm configuration information so that the multiple controller interfaces can be connected to corresponding preset robotic arms respectively. Certainly, the number of configured controller interfaces is greater than the number of robotic arms required for daily surgery to facilitate the replacement when a robotic arm is faulty. Each of the multiple robotic arms is connected to a respective one of the multiple controller interfaces of the controller based on an Industrial Ethernet so that a robotic arm replacement system can be constructed. The robotic arm of the surgical robot is replaced based on the robotic arm replacement system so that the robotic arm can be replaced easily and directly without shutting down the system. After replacement, the surgical task can continue being performed so that the operation difficulty of replacing the device can be reduced, and only the replaced robotic arm is configured for more flexibility, thereby increasing the surgical stability and safety.

Referring to FIG. 1, the structure of the robotic arm replacement system includes a controller 110 and at least two robotic arms 120. The controller 110 includes multiple interfaces. Each controller interface 111 is configured with corresponding robotic arm configuration information.

Any robotic arm 120 is connected to the controller 110 through an Industrial Ethernet based on a robotic arm identifier of the robotic arm 120 to receive and execute an operation instruction transmitted by the controller 110.

The controller 110 is configured to monitor operation states of multiple robotic arms 120, determine a to-be-replaced robotic arm 120 and generate replacement prompt information of the to-be-replaced robotic arm 120 based on the operation states of the multiple robotic arms 120, and control, in a replacement process of the to-be-replaced robotic arm 120, other robotic arms 120 to continue executing operation instructions corresponding to the other robotic arms 120 respectively, where the operation states include an operation fault state and an operation instruction state.

In the embodiment of the present disclosure, the controller 110 includes multiple controller interfaces 111, and each controller interface 111 is configured with the corresponding robotic arm configuration information. The robotic arm configuration information may include, but is not limited to, an encoding identifier of a respective robotic arm 120. When the respective robotic arm 120 is connected to the respective controller interface 111, the robotic arm configuration information is configured to perform information verification to determine the corresponding connection between the respective robotic arm 120 and the respective controller interface 111 so that the operation instruction sent by the controller 110 can be executed.

Before a robotic arm 120 is replaced, the controller 110 needs to pre-perform network configuration on each controller interface 111 to enable the controller 110 to control, based on each of the multiple controller interfaces 111, a respective one of the multiple robotic arms 120 so that operation instructions can be sent to the multiple robotic arms 120 respectively.

It is to be noted that the number of controller interfaces 111 in the controller 110 needs to be greater than the number of robotic arms 120 required for a daily surgical task. In other words, in this embodiment, the controller 110 needs to have an idle controller interface 111 to facilitate the replacement of the robotic arm 120 when the robotic arm 120 is faulty.

In this embodiment, when a robotic arm 120 is faulty during surgery, the idle controller interface 110 is used for replacing an original controller interface 111 to perform the replacement of the robotic arm 120 so that the surgical robot can continue performing the surgical task quickly, thereby reducing the surgical risk caused by a surgical interruption. It is not determined whether the failure of the connection between the original controller interface 111 and the robotic arm 120 is caused by the fault of the robotic arm 120 or the fault of the original controller interface 111, so a new robotic arm 120 is directly connected to a new controller interface 111 correspondingly to return to operate quickly. The reason for the failure may be detected after the surgical task is accomplished.

For example, network configuration on the controller interface 111 may be performed by configuring the robotic arm configuration information of a respective robotic arm 120 corresponding to each controller interface 111 on each controller interface 111 so that each controller interface 111 can be connected to a respective preset robotic arm 120. The multiple robotic arms corresponding to the robotic arm configuration information of the multiple controller interfaces have the same mechanical structure and hardware setting so that another robotic arm can be used for replacement when any robotic arm is faulty. Correspondingly, any robotic arm 120 is connected to the controller 110 through the Industrial Ethernet based on the robotic arm identifier of the robotic arm 120 to receive and execute the operation instruction transmitted by the controller 110.

The Industrial Ethernet may also be referred to as a real-time Ethernet or a real-time Industrial Ethernet. For example, EtherCAT, Profinet, EtherNet/IP and others belong to the Industrial Ethernet. In this embodiment, the type of the Ethernet used when any robotic arm 120 is connected to the controller 110 may be the Industrial Ethernet described in the preceding or an Industrial Ethernet not illustrated in the preceding. The used connection manner is not limited in this embodiment.

Exemplarily, N controller interfaces 111 are pre-config- ured within an operation system of the controller 110, are each set to an optional connection mode and are each provided with a robotic arm identifier of a connectable robotic arm 120. The system identifies the robotic arm identifier of the connected robotic arm 120 and automati- cally assigns a number to each detected and normally identified robotic arm 120, the number starting from 1. Under normal startup conditions, the default Group 1, Group 2 and Group 3 robotic arms are online, representing three groups of pre-installed robotic arms 120. Meanwhile, the system also reserves the numbering space for Group 4 to Group 10 robotic arms 120, and the operation system automatically detects the connection situation of a new robotic arm when operating. Once a new device connection is detected, the system automatically assigns, according to a robotic arm identifier of a robotic arm 120 (that is, whether the new device belongs to a group of replaceable robotic arms 120 is detected), a group number, and the remote operation state of a surgical arm is switched through a user interface or a preset value of the system.

For example, after the controller 110 configures each controller interface 111, each of the multiple robotic arms 120 is connected to a respective one of the multiple con- troller interfaces 111 of the controller 110 based on the Industrial Ethernet so that the robotic arm replacement system can be constructed. Generally speaking, the technical solution of this embodiment lies in that the Industrial Ethernet and the pre-performed network configuration enable the multiple controller interfaces 111 of the controller 110 to independently communicate with the multiple robotic arms 120 respectively so that any robotic arm 120 can be controlled separately to execute the operation instruction, thereby replacing any robotic arm 120 without shutting down the system.

For example, after the robotic arm replacement system is constructed, the controller 110 monitors the operation states of the multiple robotic arms 120, determines the to-be- replaced robotic arm 120 and generates the replacement prompt information of the to-be-replaced robotic arm 120 based on the operation states of the multiple robotic arms 120, and controls, in the replacement process of the to-be- replaced robotic arm 120, the other robotic arms 120 to continue executing the operation instructions corresponding to the other robotic arms 120 respectively.

The operation states include the operation fault state and the operation instruction state. The operation instruction state may include a state of whether the current operation instruction has been executed, for example, an unexecuted state, an ongoing state, or an executed state.

For example, the controller 110 monitors the operation states of the multiple robotic arms 120 in a surgical process. Exemplarily, whether each robotic arm 120 has a connection fault may be detected. If one or more robotic arms 120 cannot continue being used because of a detected mechani- cal fault, the replacement prompt information for replacing the one or more robotic arms 120 is generated. The staff places one or more standby robotic arms 120 next to a hospital bed and connects the one or more standby robotic arms 120 to an integration hub. After the connection is successful, the one or more replaced robotic arm 120 are automatically powered. The software system automatically detects and identifies the connection of the one or more new robotic arms 120, and a user is prompted to select the size/color of a to-be-replaced surgical arm on a user inter- face of the integration hub. After the to-be-replaced arm is determined, the staff removes the to-be-replaced robotic arm 120 and disconnects the to-be-replaced robotic arm 120 from the integration hub. Certainly, in this embodiment, the to-be-replaced robotic arm 120 may also be first removed before the new robotic arm 120 is connected; alternatively, the replacement may be performed simultaneously. The order of the replacement is not limited in this embodiment. The removal in this embodiment refers to the removal of a robotic arm 120 from a trolley or the removal of a robotic arm 120 together with the entire trolley. For example, the robotic arm 120 of the surgical robot in this embodiment may consist of a trolley and a robotic arm 120. The robotic arm 120 is detachably installed on the trolley to facilitate the flexible movement of the robotic arm 120, and the operation instruction of the controller 110 can be executed more flexibly.

Exemplarily, in the surgical process, the controller 110 monitors that a robotic arm 120 of Group 2 controlled through the right hand of the doctor is damaged, and generates information that the robotic arm 120 of Group 2 needs to be replaced and replaced by a robotic arm 120 of Group 4. The replacement prompt information that an arm of Group 2 is replaced and replaced by an arm of Group 4 may be produced through a user interface, and the staff performs the replacement of the robotic arm 120. After completion, a right hand controller 110 of a doctor console starts to control the arm of Group 4 to continue to perform the surgery. Certainly, in the process of replacing the robotic arm 120 by the staff, robotic arms 120 corresponding to Group 1 and Group 3 are controlled by an original controller 110 to continue performing the original surgical task.

For example, after the replacement of the robotic arm 120 is completed, the controller 110 further acquires an opera- tion instruction corresponding to the to-be-replaced robotic arm 120, and performs, after identifying that the to-be- replaced robotic arm 120 has been replaced, network con- figuration on the replaced target robotic arm 120 so that the target robotic arm 120 can continue to execute the operation instruction corresponding to the to-be-replaced robotic arm 120.

In this embodiment, to perform network configuration on the replaced target robotic arm 120 is to perform network configuration on the robotic arm 120 of Group 4 in the preceding exemplary content so that the right hand control- ler 110 of the doctor console can control the arm of Group 4 to continue to perform the surgery.

For example, a method for performing the network con- figuration on the target robotic arm 120 may include that network information is sent to a servo motor in the target robotic arm 120, where the network information is config- ured to acquire configuration parameters of the servo motor of the target robotic arm.

For example, the controller 110 discovers the replacement of the robotic arm 120, that is, the controller 110 scans the control network of the robotic arm 120, discovers a change in the control network and reconstructs the network topology. For example, the controller 110 initializes network configuration and parameter configuration of a servo motor in the current target robotic arm 120. Exemplarily, the controller 110 may read the configuration of the servo motor in the robotic arm 120 in a broadcast mode so that new network topology information can be constructed.

It is to be noted that the robotic arm 120 in this embodiment has the same mechanical structure and hardware configuration as the to-be-replaced robotic arm 120. For example, it is to be understood that the target robotic arm 120 has the same component category and number combination manner as the to-be-replaced robotic arm 120 and may perform the same operation instruction as the to-be-replaced robotic arm 120 so that the replaced target robotic arm 120 can continue to perform the operation instruction of the to-be-replaced robotic arm 120.

Based on the preceding multiple embodiments, the controller 110 is further configured to acquire the required number of required robotic arms 120 and the connected number of connected robotic arms 120. If the required number does not equal the connected number, the number change prompt information for increasing or decreasing the number of robotic arms 120 is generated.

For example, based on a received operation instruction, the controller 110 determines the required number of robotic arms 120 required for the operation instruction and the connected number of connected robotic arms 120 of the multiple controller interfaces 111. The required number of robotic arms 120 is compared with the connected number of robotic arms 120 numerically. If the required number does not equal the connected number, the number change prompt information for increasing or decreasing the number of robotic arms 120 is generated.

Exemplarily, if the required number is greater than the connected number, the number change prompt information for increasing the number of robotic arms 120 is generated; and if the required number is less than the connected number, the number change prompt information for decreasing the number of robotic arms 120 is generated.

For example, after the number change prompt information for increasing or decreasing the number of robotic arms 120 is generated, that is, if a robotic arm 120 is determined to be added, an interface state of a controller interface 111 is acquired; if the controller 111 has an idle interface, the idle interface is allocated to the robotic arm 120 determined to be added; and if the controller 110 does not have the idle interface, the addition prompt information that the robotic arm 120 cannot be added is generated.

For example, the number change prompt information may also indicate which robotic arm is in the connected state and which robotic arm is in the disconnected state.

In the technical solution of this embodiment, before the surgical task is performed, the multiple controller interfaces 111 of the controller 110 are each pre-configured with the corresponding robotic arm configuration information so that each controller interface 111 can be connected to a respective preset robotic arm 120. Certainly, the number of configured controller interfaces 111 is greater than the number of robotic arms 120 required for the daily surgery to facilitate the replacement when a robotic arm 120 is faulty. Each of the multiple robotic arms 120 is connected to a respective one of the multiple controller interfaces 111 of the controller 110 based on the Industrial Ethernet so that the robotic arm replacement system can be constructed. The robotic arm 120 of the surgical robot is replaced based on the robotic arm replacement system so that the robotic arm 120 can be replaced easily and directly without shutting down the system. After replacement, the surgical task can continue being performed so that the operation difficulty of replacing the device can be reduced, and only the replaced robotic arm 120 is configured for more flexibility, thereby increasing the surgical stability and safety.

The following is an embodiment of a robotic arm replacement method provided by the embodiment of the present disclosure. The method belongs to the same application concept as the robotic arm replacement system in the preceding multiple embodiments. For details not described in detail in the embodiment of the robotic arm replacement method, references may be made to the preceding embodiments of the robotic arm replacement system.

Figure 2:
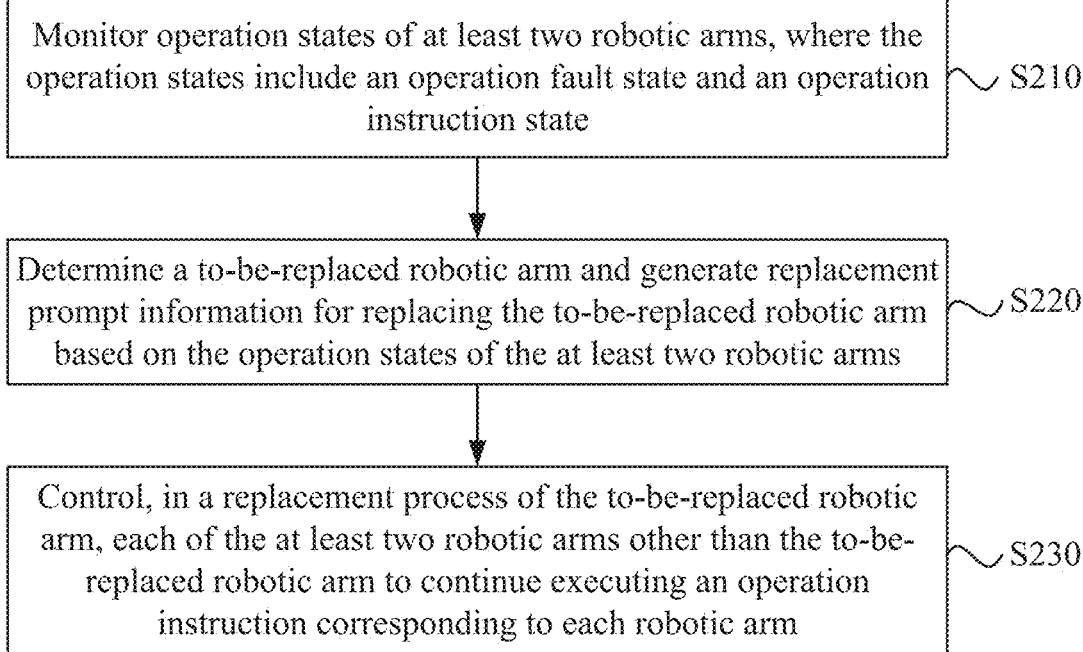
FIG. 2 is a flowchart of a robotic arm replacement method according to an embodiment of the present disclosure.

FIG. 2 is a flowchart of a robotic arm replacement method according to an embodiment of the present disclosure. This embodiment is applicable to the replacement of a robotic arm of a surgical robot during operation. The method may be performed by a robotic arm replacement apparatus. The apparatus may be implemented by use of software and/or hardware. As shown in FIG. 2, the method includes the steps below.

In S210, operation states of at least two robotic arms are monitored, where the operation states include an operation fault state and an operation instruction state.

In S220, based on the operation states of the at least two robotic arms, a to-be-replaced robotic arm is determined, and replacement prompt information for replacing the to-be-replaced robotic arm is generated.

In S230, each of the at least two robotic arms other than the to-be-replaced robotic arm is controlled to continue executing an operation instruction corresponding to each robotic arm in a replacement process of the to-be-replaced robotic arm.

In the technical solution of this embodiment, before a surgical task is performed, multiple controller interfaces of a controller are each pre-configured with corresponding robotic arm configuration information so that each controller interface can be connected to a respective preset robotic arm. Certainly, the number of configured controller interfaces is greater than the number of robotic arms required for daily surgery to facilitate the replacement when a robotic arm is faulty. Each of multiple robotic arms is connected to a respective one of the multiple controller interfaces of the controller based on an Industrial Ethernet so that a robotic arm replacement system can be constructed. The robotic arm of the surgical robot is replaced based on the robotic arm replacement system so that the robotic arm can be replaced easily and directly without shutting down the system. After replacement, the surgical task can continue being performed so that the operation difficulty of replacing the device can be reduced, and only the replaced robotic arm is configured for more flexibility, thereby increasing the surgical stability and safety.

In some embodiments, the robotic arm replacement method may also be performed by the controller in the robotic arm replacement system described above.

The following is an embodiment of a robotic arm replacement apparatus provided by the embodiment of the present disclosure. The apparatus belongs to the same application concept as the robotic arm replacement method and system in the preceding multiple embodiments. For details not described in detail in the embodiment of the robotic arm replacement apparatus, references may be made to the preceding multiple embodiments of the robotic arm replacement method and system.

In some embodiments, the robotic arm replacement apparatus may be provided in the controller of the robotic arm replacement system.

Figures 3, 4:
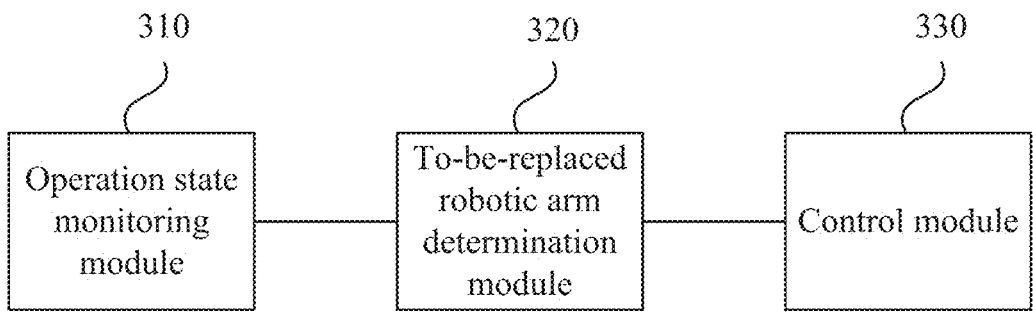
FIG. 3 is a diagram illustrating the structure of a robotic arm replacement apparatus according to an embodiment of the present disclosure.
FIG. 4 is a diagram illustrating the structure of an electronic device according to an embodiment of the present disclosure.

FIG. 3 is a diagram illustrating the structure of a robotic arm replacement apparatus according to an embodiment of the present disclosure. This embodiment is applicable to the replacement of a robotic arm of a surgical robot during operation. Referring to FIG. 3, the structure of the robotic arm replacement apparatus includes an operation state monitoring module 310, a to-be-replaced robotic arm determination module 320 and a control module 330. The operation state monitoring module 310 is configured to monitor operation states of at least two robotic arms, where the operation states include an operation fault state and an operation instruction state.

The to-be-replaced robotic arm determination module 320 is configured to determine a to-be-replaced robotic arm and generate replacement prompt information for replacing the to-be-replaced robotic arm based on the operation states of the at least two robotic arms.

The control module 330 is configured to control, in a replacement process of the to-be-replaced robotic arm, other robotic arms to operate normally.

In the technical solution of this embodiment, before a surgical task is performed, multiple controller interfaces of a controller are each pre-configured with corresponding robotic arm configuration information so that the multiple controller interfaces can be correspondingly connected to preset robotic arms respectively. Certainly, the number of configured controller interfaces is greater than the number of robotic arms required for daily surgery to facilitate the replacement when a robotic arm is faulty. Each of multiple robotic arms is connected to a respective one of the multiple controller interfaces of the controller based on an Industrial Ethernet so that a robotic arm replacement system can be constructed. The robotic arm of the surgical robot is replaced based on the robotic arm replacement system so that the robotic arm can be replaced easily and directly without shutting down the system. After replacement, the surgical task can continue being performed so that the operation difficulty of replacing the device can be reduced, and only the replaced robotic arm is configured for more flexibility, thereby increasing the surgical stability and safety.

For example, the apparatus further includes a target robotic arm configuration module.

The target robotic arm configuration module is configured to perform network configuration on a target robotic arm corresponding to the to-be-replaced robotic arm after the to-be-replaced robotic arm is replaced so that the target robotic arm can continue, based on the acquired operation instruction corresponding to the to-be-replaced robotic arm, to execute the operation instruction corresponding to the to-be-replaced robotic arm.

For example, the target robotic arm configuration module includes a network parameter sending unit.

The network parameter sending unit is configured to send network information to a servo motor in the target robotic arm, where the network information is configured to acquire configuration parameters of the servo motor of the target robotic arm.

The robotic arm replacement apparatus provided in the embodiment of the present disclosure may perform the robotic arm replacement method provided in any embodiment of the present disclosure and has functional modules and beneficial effects corresponding to the performed method.

It is to be noted that units and modules included in the preceding embodiment of the robotic arm replacement apparatus are just divided according to functional logic, and the division is not limited to this, as long as the corresponding functions can be achieved. In addition, the names of the functional units are just intended for distinguishing and are not to limit the scope of the present disclosure.

FIG. 4 is a diagram illustrating the structure of an electronic device according to an embodiment of the present disclosure. FIG. 4 shows a block diagram of an example electronic device 12 for implementing the embodiments of the present disclosure. The electronic device 12 shown in FIG. 4 is only an example and is not intended to limit the function and use scope of the embodiments of the present disclosure.

As shown in FIG. 4, the electronic device 12 may take the form of a general-purpose computer device. Components of the electronic device 12 may include, but are not limited to, one or more processors or processing units 16, a system memory 28, and a bus 18 connecting different system components (including the system memory 28 and the one or more processing units 16).

The bus 18 represents one or more of several bus structures, including a memory bus or memory controller, a peripheral bus, an accelerated graphics port and a processor, or represents a local bus using any one of multiple bus structures. For example, these architectures include, but are not limited to, an Industry Standard Architecture (ISA) bus, a Micro Channel Architecture (MCA) bus, an enhanced ISA bus, a Video Electronics Standards Association (VESA) local bus and a Peripheral Component Interconnect (PCI) bus.

The electronic device 12 may include multiple computer system readable media. These media may be available media that can be accessed by the electronic device 12. These media include volatile and non-volatile media, and removable and non-removable media.

The system memory 28 may include a computer system readable medium in the form of a volatile memory, such as a random-access memory (RAM) 30 and/or a cache memory 32. The electronic device 12 may include other removable/non-removable, volatile/non-volatile computer system storage media. Just exemplarily, a storage system 34 may be configured to perform reading and writing on a non-removable and non-volatile magnetic medium (not shown in FIG. 4 and usually referred to as a "hard disk driver"). Although not shown in FIG. 4, a magnetic disk driver for performing reading and writing on a removable non-volatile magnetic disk (such as a "floppy disk") and an optical disk driver for performing reading and writing on a removable non-volatile optical disk (such as a compact disc read-only memory (CD-ROM), a Digital Video Disc read-only memory (DVD-ROM), or another optical medium) may be provided. In these cases, each driver may be connected to the bus 18 through one or more data media interfaces. The system memory 28 may include at least one program product having a group of program modules (such as at least one program module). These program modules are configured to perform functions of multiple embodiments of the present disclosure.

A program/utility 40 having a group of program modules 42 (at least one program module 42) may be stored in, for example, the system memory 28. These program modules 42 include, but are not limited to, an operating system, one or more application programs and other program modules and program data. Each or some combination of these examples may include implementation of a network environment.

These program modules 42 generally perform functions and/or methods in the embodiments of the present disclosure.

The electronic device 12 may also communicate with one or more external devices 14 (such as a keyboard, a pointing device and a display 24). The electronic device 12 may further communicate with one or more devices that enable a user to interact with the electronic device 12, and/or with any device (such as a network card or a modem) that enables the electronic device 12 to communicate with one or more other computing devices. These communications may be performed through an input/output (I/O) interface 22. Moreover, the electronic device 12 may further communicate with one or more networks (such as a local area network (LAN), a wide area network (WAN) and/or a public network, for example, the Internet) through a network adapter 20. As shown in FIG. 4, the network adapter 20 communicates with other modules of the electronic device 12 through the bus 18. It is to be understood that though not shown in FIG. 4, other hardware and/or software modules may be used in conjunction with the electronic device 12. The other hardware and/or software modules include, but are not limited to, microcode, a device driver, a redundant processing unit, an external disk drive array, a redundant arrays of independent disks (RAID) system, a tape driver and a data backup storage system.

The one or more processing units 16 run a program stored in the system memory 28 to perform various functional applications and robotic arm replacement, for example, to perform the steps of a robotic arm replacement method provided in an embodiment of the present disclosure. The robotic arm replacement method includes the steps below.

Operation states of at least two robotic arms are monitored, where the operation states include an operation fault state and an operation instruction state.

Based on the operation states of the at least two robotic arms, a to-be-replaced robotic arm is determined, and replacement prompt information for replacing the to-be-replaced robotic arm is generated.

Other robotic arms are controlled to continue executing operation instructions corresponding to the other robotic arms respectively in a replacement process of the to-be-replaced robotic arm.

Certainly, it is to be understood by those skilled in the art that a processor can also perform the technical solutions of the robotic arm replacement method provided in any embodiment of the present disclosure.

In some embodiments, the processor in the electronic device may be the controller in the above-described robotic arm replacement system.

An embodiment provides a computer-readable storage medium storing a computer program which, when executed by a processor, causes the processor to perform, for example, the steps of a robotic arm replacement method provided in an embodiment of the present disclosure. The robotic arm replacement method includes the steps below.

Operation states of at least two robotic arms are monitored, where the operation states include an operation fault state and an operation instruction state.

Based on the operation states of the at least two robotic arms, a to-be-replaced robotic arm is determined, and replacement prompt information for replacing the to-be-replaced robotic arm is generated.

Other robotic arms are controlled to continue executing operation instructions corresponding to the other robotic arms respectively in a replacement process of the to-be-replaced robotic arm.

A computer storage medium in the embodiment of the present disclosure may adopt any combination of one or more computer-readable mediums. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof. More examples of the computer-readable storage medium include (non-exhaustive list): an electrical connection having one or more wires, a portable computer magnetic disk, a hard disk, a random-access memory (RAM), a read-only memory (ROM), an erasable programmable read-only memory (EPROM) or flash memory, an optical fiber, a portable compact disk read-only memory (CD-ROM), an optical memory, a magnetic memory, or any suitable combination thereof. In this document, the computer-readable storage medium may be any tangible medium including or storing a program. The program may be used by or used in conjunction with an instruction execution system, apparatus, or device. The computer-readable storage medium may be a non-transitory computer-readable storage medium.

The computer-readable signal medium may include a data signal propagated in a baseband or as part of a carrier. Computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable medium may send, propagate or transmit a program used by or used in conjunction with an instruction execution system, apparatus or device.

Program codes included in the computer-readable medium may be transmitted using any suitable medium, including, but not limited to, a wireless medium, a wired medium, an optical cable, a radio frequency (RF) and the like or any suitable combination thereof.

Computer program codes for performing the operations of the present disclosure may be written in one or more programming languages or a combination thereof. The programming languages include object-oriented programming languages such as Java, Smalltalk, C++ and further include conventional procedural programming languages such as "C" programming language or similar programming languages. The program codes may be executed entirely on a user computer, partly on a user computer, as a stand-alone software packet, partly on a user computer and partly on a remote computer, or entirely on a remote computer or a server. In the case where the remote computer is involved, the remote computer may be connected to the user computer through any network including a local area network (LAN) or a wide area network (WAN) or may be connected to an external computer (for example, via the Internet through an Internet service provider).

It is to be understood by those of ordinary skill in the art that the preceding modules or steps of the present disclosure may be implemented by a general-purpose computing apparatus, and the modules or steps may be concentrated on a single computing apparatus or distributed on a network composed of multiple computing apparatuses. Optionally, the modules or steps may be implemented by program codes executable by the computing apparatus so that the modules or steps can be stored in a storage apparatus and executed by the computing apparatus. Alternatively, the modules or steps may be made into integrated circuit modules respectively, or multiple modules or steps therein may be made into a single integrated circuit module for implementation. In this way, the present disclosure is not limited to any specific combination of hardware and software.

What is claimed is:

1. A robotic arm replacement system, comprising: a controller and at least two robotic arms;

wherein the controller comprises a plurality of controller interfaces, and each of the plurality of controller interfaces is configured with robotic arm configuration information;

wherein for each robotic arm, the robotic arm is connected to the controller through an Industrial Ethernet based on a robotic arm identifier of the robotic arm to receive and execute an operation instruction corresponding to the robotic arm transmitted by the controller; and wherein the controller is configured to monitor operation states of the at least two robotic arms, determine a first robotic arm from the at least two robotic arms as a to-be-replaced robotic arm and generate replacement prompt information of the to-be-replaced robotic arm based on the operation states of the at least two robotic arms, and control, in a replacement process of the to-be-replaced robotic arm using a target robotic arm, a second robotic arm other than the to-be-replaced robotic arm and the target robotic arm to continue executing an operation instruction corresponding to the second robotic arm, wherein the operation states comprise an operation fault state and an operation instruction state, and wherein the target robotic arm has a same mechanical structure and hardware configuration as the to-be-replaced robotic arm, and a controller interface corresponding to the target robotic arm is different from a controller interface corresponding to the to-be-replaced robotic arm.

2. The system according to claim 1, wherein the controller is further configured to pre-perform network configuration on the plurality of controller interfaces of the controller based on the robotic arm configuration information, and control, based on each of the plurality of controller interfaces, a respective one of the at least two robotic arms.

3. The system according to claim 1, wherein the controller is further configured to acquire an operation instruction corresponding to the to-be-replaced robotic arm, and perform, after identifying that the to-be-replaced robotic arm has been replaced with the target robotic arm, network configuration on the target robotic arm to enable the target robotic arm to continue to execute the operation instruction corresponding to the to-be-replaced robotic arm.

4. The system according to claim 1, wherein the controller is further configured to acquire a required number of required robotic arms and an installed number of connected robotic arms and generate, in response to determining that the required number does not equal the installed number, number change prompt information for increasing or decreasing the installed number of connected robotic arms.

5. The system according to claim 4, wherein the controller is further configured to, acquire, in response to determining that a robotic arm needs to be added, interface states of the plurality of controller interfaces;

allocate, in response to determining that the controller has an idle interface, the idle interface to the robotic arm needed to be added; or generate, in response to determining that the controller does not have an idle interface, addition prompt information for inability to add the robotic arm.

6. A robotic arm replacement method, comprising:

monitoring operation states of at least two robotic arms, wherein the operation states comprise an operation fault state and an operation instruction state;

determining a first robotic arm from the at least two robotic arms as a to-be-replaced robotic arm and generating replacement prompt information for replacing the to-be-replaced robotic arm based on the operation states of the at least two robotic arms; and controlling, in a replacement process of the to-be-replaced robotic arm using a target robotic arm, a second robotic arm other than the to-be-replaced robotic arm and the target robotic arm to continue executing an operation instruction corresponding to the second robotic arm, wherein the target robotic arm has a same mechanical structure and hardware configuration as the to-be-replaced robotic arm, and a controller interface corresponding to the target robotic arm is different from a controller interface corresponding to the to-be-replaced robotic arm.

7. The method according to claim 6, further comprising:

performing network configuration on the target robotic arm, after replacing the to-be-replaced robotic arm with the target robotic arm, to enable the target robotic arm to continue, based on an acquired operation instruction corresponding to the to-be-replaced robotic arm, to execute the operation instruction corresponding to the to-be-replaced robotic arm.

8. The method according to claim 7, wherein performing the network configuration on the target robotic arm comprises:

sending network information to a servo motor in the target robotic arm, to acquire configuration parameters of the servo motor of the target robotic arm.

9. A non-transitory computer-readable storage medium storing a computer program which, when executed by a processor, causes the processor to perform the robotic arm replacement method according to claim 6.

10. The storage medium according to claim 9, wherein the computer program, when executed by the processor, causes the processor to perform:

after replacing the to-be-replaced robotic arm with the target robotic arm, performing network configuration on the target robotic arm to enable the target robotic arm to continue, based on an acquired operation instruction corresponding to the to-be-replaced robotic arm, to execute the operation instruction corresponding to the to-be-replaced robotic arm.

11. The storage medium according to claim 10, wherein the computer program, when executed by the processor, causes the processor to perform the performing the network configuration on the target robotic arm by:

sending network information to a servo motor in the target robotic arm to acquire configuration parameters of the servo motor of the target robotic arm.

12. An electronic device, comprising:

at least one processor; and a storage apparatus configured to store at least one program, wherein when executed by the at least one processor, the at least one program causes the at least one processor to perform:

monitoring operation states of at least two robotic arms, wherein the operation states comprise an operation fault state and an operation instruction state;

determining a first robotic arm from the at least two robotic arms as a to-be-replaced robotic arm and generating replacement prompt information for replacing the to-be-replaced robotic arm based on the operation states of the at least two robotic arms; and controlling, in a replacement process of the to-be-replaced robotic arm using a target robotic arm, a second robotic arm other than the to-be-replaced robotic arm and the target robotic arm to continue executing an operation instruction corresponding to the second robotic arm, wherein the target robotic arm has a same mechanical structure and hardware configuration as the to-be-replaced robotic arm, and a controller interface corresponding to the target robotic arm is different from a controller interface corresponding to the to-be-replaced robotic arm.

13. The electronic device according to claim 12, wherein when executed by the at least one processor, the at least one program causes the at least one processor to perform:

after replacing the to-be-replaced robotic arm with the target robotic arm, performing network configuration on the target robotic arm to enable the target robotic arm to continue, based on an acquired operation instruction corresponding to the to-be-replaced robotic arm, to execute the operation instruction corresponding to the to-be-replaced robotic arm.

14. The electronic device according to claim 13, wherein when executed by the at least one processor, the at least one program causes the at least one processor to perform performing the network configuration on the target robotic arm by:

sending network information to a servo motor in the target robotic arm to acquire configuration parameters of the servo motor of the target robotic arm.

* * * * *